(12) United States Patent
Kennedy

(10) Patent No.: US 11,718,972 B2
(45) Date of Patent: Aug. 8, 2023

(54) IMAGE-BASED ATTACHMENT IDENTIFICATION AND POSITION DETECTION

(71) Applicant: DEERE & COMPANY, Moline, IL (US)

(72) Inventor: Thomas L. Kennedy, Dubuque, IA (US)

(73) Assignee: Deere & Company, Moline, IL (US)

(*) Notice: Subject to any disclaimer, the term of this patent is extended or adjusted under 35 U.S.C. 154(b) by 425 days.

(21) Appl. No.: 16/891,416

(22) Filed: Jun. 3, 2020

(65) Prior Publication Data
US 2021/0381194 A1 Dec. 9, 2021

(51) Int. Cl.
| | | |
|---|---|---|
| *E02F 3/43* | (2006.01) | |
| *B60R 11/04* | (2006.01) | |
| *E02F 9/26* | (2006.01) | |
| *G05B 13/02* | (2006.01) | |
| *G06N 3/08* | (2023.01) | |

(Continued)

(52) U.S. Cl.
CPC .............. *E02F 3/434* (2013.01); *B60R 11/04* (2013.01); *E02F 9/265* (2013.01); *G05B 13/027* (2013.01); *G06N 3/08* (2013.01); *E02F 3/3405* (2013.01); *E02F 3/3417* (2013.01); *E02F 3/422* (2013.01)

(58) Field of Classification Search
USPC .......................................................... 701/50
See application file for complete search history.

(56) References Cited

U.S. PATENT DOCUMENTS

| | | | |
|---|---|---|---|
| 9,938,693 B1* | 4/2018 | Reed ................... | G06Q 10/0833 |
| 10,011,976 B1* | 7/2018 | Forcash ................ | E02F 9/264 |
| 11,266,056 B2* | 3/2022 | Nair ...................... | A01B 33/08 |

(Continued)

FOREIGN PATENT DOCUMENTS

| | | |
|---|---|---|
| DE | 102017109939 A1 | 11/2017 |
| DE | 102018123216 A1 | 3/2019 |

(Continued)

OTHER PUBLICATIONS

German Search Report issued in application No. DE102021204424.7 dated Jan. 26, 2022 (06 pages).

*Primary Examiner* — Jonathan M Dager
(74) *Attorney, Agent, or Firm* — Michael Best & Friedrich LLP

(57) ABSTRACT

Method and systems for operating a work vehicle with a selectively interchangeable implement. Image data is captured by a camera (and/or other type of optical sensor) mounted on the work vehicle. The captured image data includes at least a portion of a first implement and the implement type of the first implement is identified by processing the captured image data. Operation information correspond to the identified implement type is accessed from a non-transitory computer-readable memory and an operation of the work vehicle is automatically adjusted based on the accessed operation information for the identified implement type. In some implementations, the implement type is determined by providing the captured image data as input to an artificial neural network and, in some implementations, the artificial neural network is configured to also output an indication of a current operating position of the implement based on the captured image data.

15 Claims, 5 Drawing Sheets

(51) Int. Cl.
　　　*E02F 3/34*　　　(2006.01)
　　　*E02F 3/42*　　　(2006.01)

(56) References Cited

U.S. PATENT DOCUMENTS

| | | | | |
|---|---|---|---|---|
| 2005/0261799 | A1* | 11/2005 | Groth | E02F 3/435 |
| | | | | 700/180 |
| 2014/0277962 | A1* | 9/2014 | Lougheed | B66F 9/20 |
| | | | | 701/50 |
| 2016/0312432 | A1* | 10/2016 | Wang | E02F 9/2012 |
| 2018/0171590 | A1 | 6/2018 | Kean | |
| 2018/0187398 | A1* | 7/2018 | Forcash | E02F 9/264 |
| 2019/0024345 | A1* | 1/2019 | Thomsen | E02F 3/96 |
| 2020/0071913 | A1 | 3/2020 | Garcia Corrochano | |
| 2020/0326713 | A1* | 10/2020 | Spielman | G05D 1/0248 |
| 2021/0004744 | A1* | 1/2021 | Petrany | G07C 5/008 |
| 2021/0040713 | A1* | 2/2021 | Yamanaka | E02F 9/264 |

FOREIGN PATENT DOCUMENTS

| | | |
|---|---|---|
| DE | 102019206515 A1 | 12/2019 |
| EP | 1862050 B1 | 6/2009 |

\* cited by examiner

IMAGE-BASED ATTACHMENT IDENTIFICATION AND POSITION DETECTION

BACKGROUND

The present invention relates to systems and methods for operating work vehicles with a selectively interchangeable implement attachment.

SUMMARY

In one embodiment, the invention provides a method of operating a work vehicle with a selectively interchangeable implement. Image data is captured by a camera mounted on the work vehicle. The captured image data includes at least a portion of a first implement and the implement type of the first implement is identified by processing the captured image data. Operation information correspond to the identified implement type is accessed from a non-transitory computer-readable memory and an operation of the work vehicle is automatically adjusted based on the accessed operation information for the identified implement type.

In some implementations, the implement type is determined by providing the captured image data as input to an artificial neural network that is trained to output an indication of the implement type in response to receiving as input image data that includes at least a portion of the implement. In some implementations, the artificial neural network is further configured to output an indication of a current operating position of the implement based on the captured image data.

In another embodiment, the invention provides a control system for a work vehicle. The work vehicle is operatively coupleable to a selectively interchangeable implement. The control system includes a camera system, a non-transitory computer-readable memory, and an electronic processor. The camera system is mounted on the work vehicle and positioned with a field of view that includes at least a portion of an implement coupled to the work vehicle. The non-transitory computer-readable memory stores operation information corresponding to each of a plurality of implements. The electronic processor is configured to perform an operation by controllably adjusting a position of the implement relative to the work vehicle. The electronic processor receives image data captured by the camera system and applies an artificial neural network to identify an implement type of the implement that is current coupled to the work vehicle based on the image data from the camera system. The artificial neural network is trained to receive the image data as input and to produce as the output an indication of the implement type. The electronic processor accesses the operation information corresponding to the identified implement type from the memory and automatically adjusts the operation of the work vehicle based on the accessed operation information corresponding to the identified implement type.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
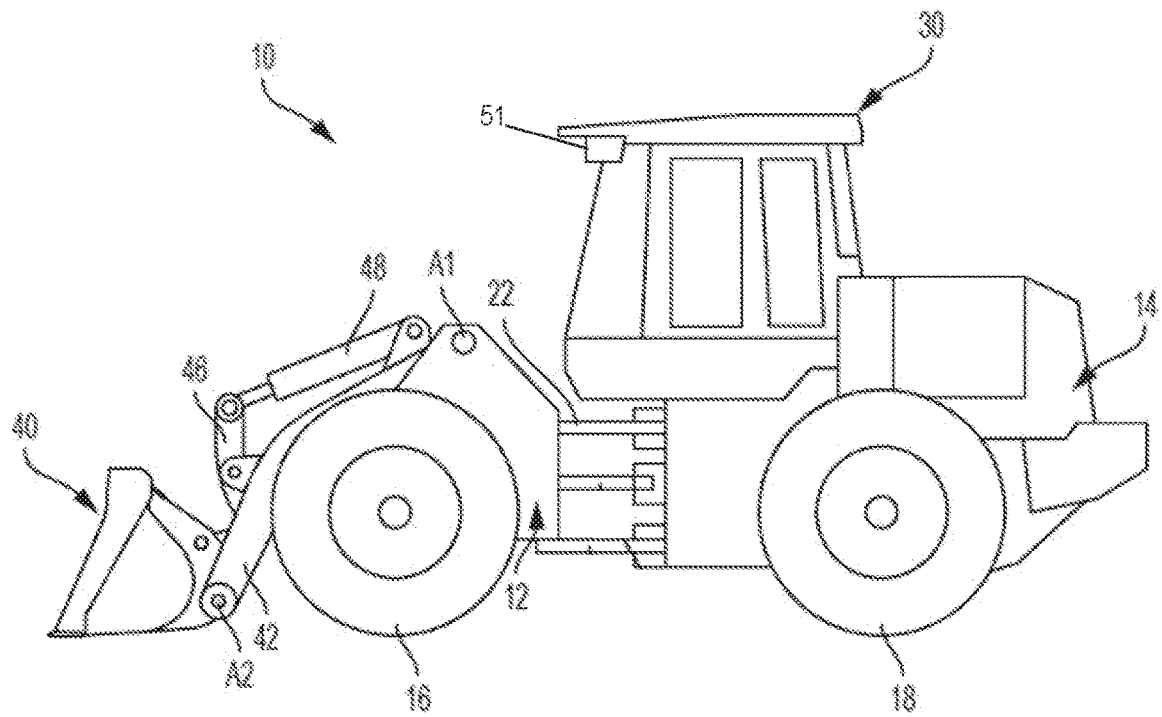
FIGS. 1A and 1B are perspective views of a wheel-loader equipped with a selectively interchangeable bucket attachment according to one implementation.
Figure 1B:
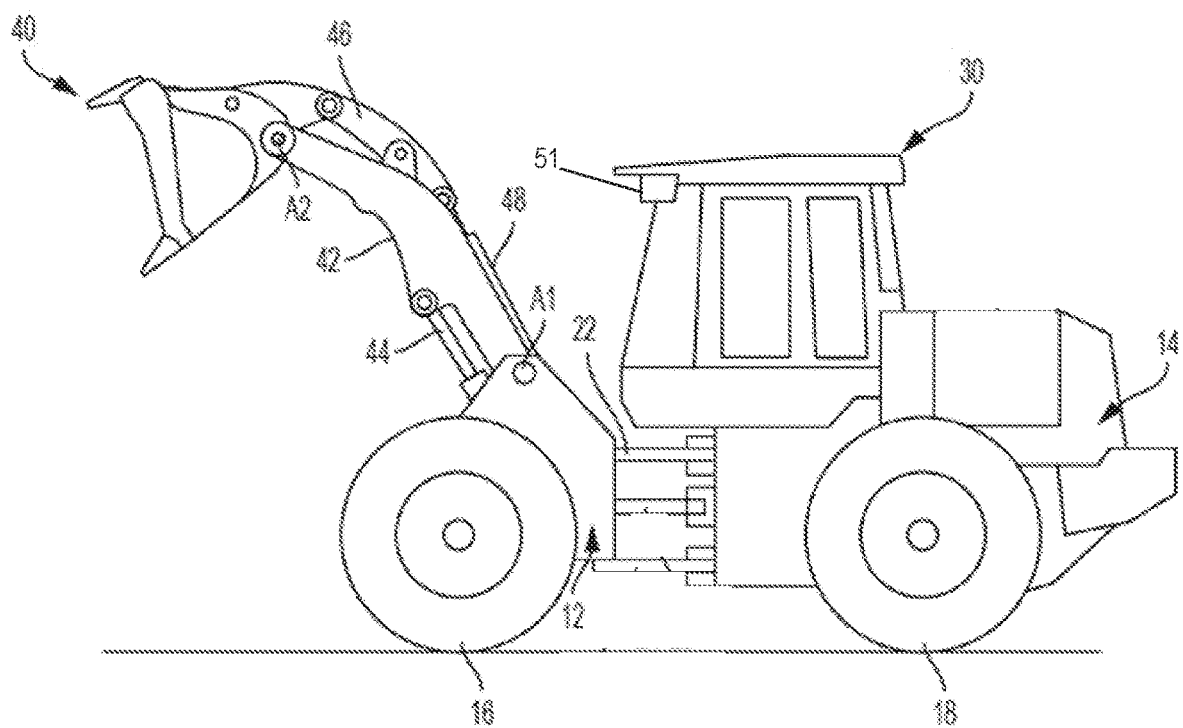

FIGS. 1A and 1B illustrate an example of a wheel loader 10. The wheel loader 10 includes a front section 12 and a rear section 14. A pair of front wheels 16 are rotatably coupled to the front section 12 of the wheel loader 10 and a pair of rear wheels 18 is rotatably coupled to the rear section 14. Mechanical power is applied by the wheel loader 10 to rotate the rear wheels 18 causing locomotive movement of the wheel loader 10. Turning of the wheel loader 10 is achieved by controllably pivoting the front section 12 relative to the rear section 14 using a pivot coupling 22 that couples the from section 12 to the rear section 14. A cab 30 is supported by the rear section 14 of the wheel loader 10. An operator of the wheel loader 10 is positioned within the cab 30 during operation of the wheel loader 10.

An implement boom 42 is pivotably coupled to the front section 12 of the wheel loader 10 by a first boom pivot joint A1. A first hydraulic cylinder 42 is coupled between the front section 12 and the boom 42 to control movement of the boom 42 in a vertical orientation. Specifically, operating the hydraulic cylinder 42 to extend its piston raises the boom 42 and retracting the piston of the hydraulic cylinder 42 lowers the boom 42.

The wheel loader 10 is configured with a coupler linkage for selectively attaching, detaching, and interchanging an attachment to the distal end of the boom 42. In the example of FIGS. 1A and 1B, the selectively interchangeable attachment that is coupled to the wheel loader 10 is a bucket 40. The bucket 40 is tiltably coupled to the distal end of the boom at coupler linkage A2. The bucket 40 is also selectively coupled to a second hydraulic cylinder 48 by a tilt linkage 46. In this arrangement, the implement (in this case, the bucket 40) is tilted downward relative to the boom 42 by operating the second hydraulic cylinder 48 to retract its piston and is tilted upward relative to the boom 42 by operating the second hydraulic cylinder 48 to extend its piston.

As noted above, the wheel-loader 10 illustrated in FIGS. 1A and 1B is equipped with a coupler for selectively attaching, detaching, and interchanging an implement to the distal end of the boom 42. This interchangeability enables the wheel loader 10 to be employed in a variety of different applications with different attachments used for different applications. However, the specific attachment that is coupled to the wheel loader may affect how the wheel-loader 10 operates (or how it should be operated for a particular task). In some implementations, the wheel-loader 10 is configured to automatically enable certain features and/or make adjustments to certain settings on the machine for optimum performance or operator preference depending on the type of implement that is currently attached to the wheel loader 10.

Figure 2:
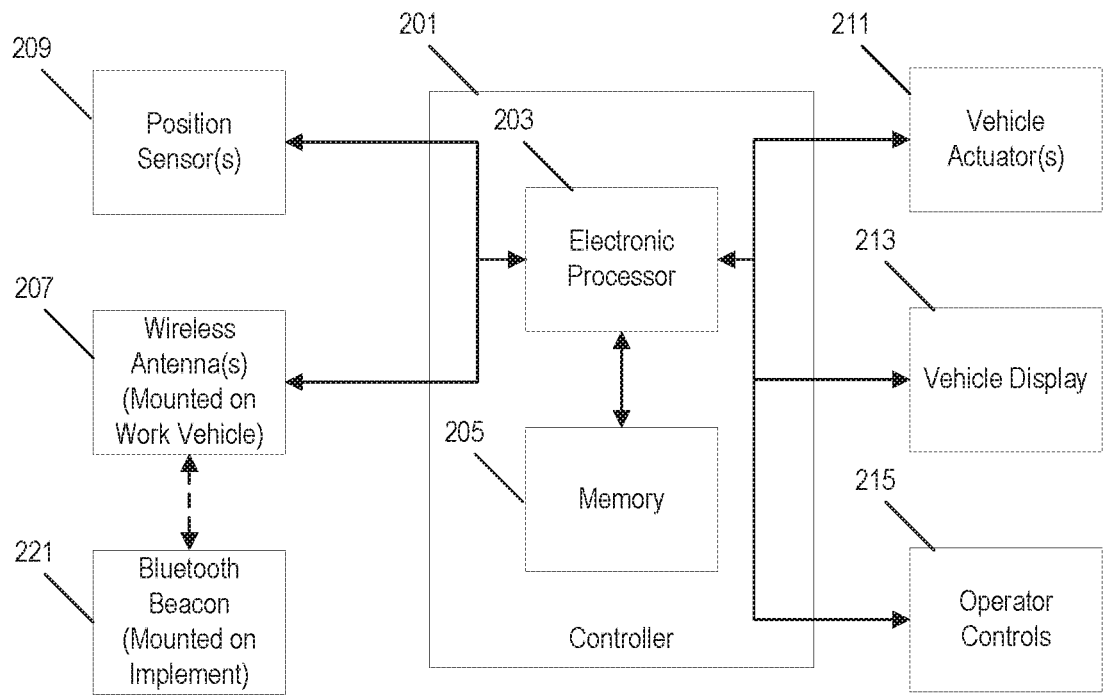
FIG. 2 is a block diagram of a first example of a control system for operating the wheel-loader of FIGS. 1A and 1B based on an identified implement type and a determined position of the selectively interchangeable attachment.

FIG. 2 illustrates a first example of a control system for the wheel loader 10. A controller 201 for the wheel leader 10 includes an electronic processor 203 and a non-transitory computer-readable memory 205. In some implementations, the memory 205 stores data and computer-executable instructions. The computer-executable instructions are accessed from the memory 205 and executed by the electronic processor 203 to provide the functionality of the controller 201. The controller 201 is also communicative coupled to one or more wireless antennas mounted on the wheel loader 10 and one of more position sensors 209 configured to monitor the position of the implement (e.g., bucket 40) and the boom 42 relative to the wheel loader 10. The controller 201 is also configured to control the operation of the wheel loader 10 by generating and transmitting control signals to one or more vehicle actuators 211 (e.g., a hydraulic pump for cylinders 44, 48; a motor for controlling the turning pivot of pivot coupling 22 to turn the wheel loader 10; a motor for controlling the drive power applied to the rear wheels 18; etc.). In some implementations, the controller 201 also provides output data that is shown to the operator of the wheel-loader on a vehicle display 213 in the cab 30 and receives user input signals from one or more operator controls 215.

In some implementations, the implement (e.g., the bucket 40) is equipped with a Bluetooth Beacon 221 that is fixedly mounted to the attachment. The Bluetooth Beacon 221 communicates with the controller 201 through the wireless antenna 207 and the controller 201 is configured to identify the implement that is currently coupled to the wheel-loader 10 based on the signal received from the Bluetooth Beacon 221. In some implementations, after identifying the implement based on the signal from its Bluetooth Beacon 221, the controller 201 is configured to automatically enable certain features associated with the identified implement and adjust certain settings of the wheel loader 10. For example, the controller 201 may define a maximum and/or minimum boom height, a maximum and/or minimum tilt angle, a maximum and/or minimum vehicle speed based on the particular implement that is currently attached to the wheel loader 10 and, in some implementations, operations associated with the identified implement.

Furthermore, in some implementations, the controller 201 is configured for simplified or enhanced operation by providing a variety of automated (or semi-automated) functions including, for example, "return-to-dig," "return-to-carry," and electro-hydraulic soft stops. To perform these automated or semi-automated functions, the controller 201 first determines a current position of the implement in order to then determine which adjustments to the position must be made for the automated or semi-automated operation. In some implementations (such as, for example, implementations with the control system of FIG. 2), the controller 201 is configured to determine the position of the implement attached to the wheel loader 10 based on signals received from one or more rotary position sensors 209 (e.g., rotary position sensors configured to monitor the first boom pivot joint A1 and the tiltable coupling A2). However, position sensors 209 require electrical and mechanical components to be placed on the linkage with wiring harnesses routed to and from the sensor 209 in locations that are prone to experience debris or damage.

Figure 3:
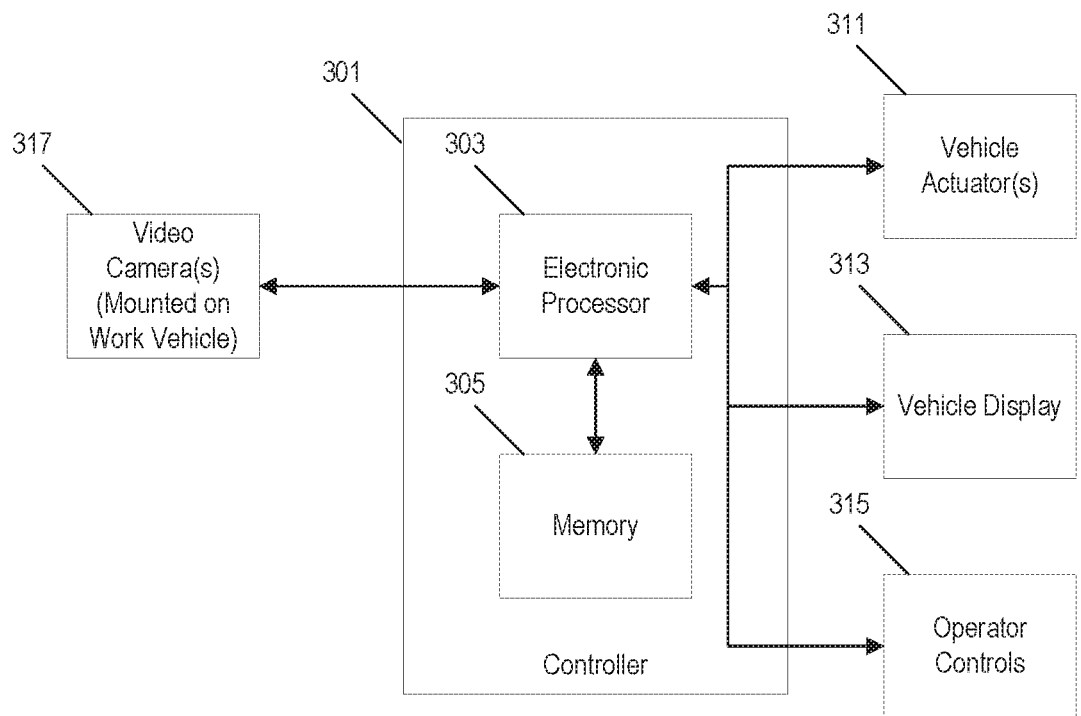
FIG. 3 is a block diagram of a second example of a control system for operating the wheel-loader of FIGS. 1A and 1B based on an identified implement type and a determined position of the selectively interchangeable attachment.

FIG. 3 illustrates an example of an alternative control system in which a camera-based mechanism is used to determine the identity and the position of the implement attached to the wheel loader 10 instead of using a Bluetooth Beacon 221 and position sensors 209 as in the example of FIG. 2. As in the example of FIG. 2, the wheel loader controller 301 also includes an electronic processor 303 and a non-transitory computer-readable memory 305 and is communicatively coupled to one or more vehicle actuators 311, a vehicle display 313, and operator controls 315. However, the controller 301 is also communicatively coupled to one or more camera system 317 mounted to the wheel loader 10. For example, the one or more cameras 301 may be mounted to the cab 30 of the wheel loader as shown in the example of FIGS. 1A and 1B (i.e., camera system 51). In some implementations, the one or more cameras 317 includes a stereo camera system positioned on the wheel loader 10 with a field of view that includes the linkage coupling the wheel loader 10 to the selectively interchangeable attachment (e.g., the bucket 40).

In some implementations, the camera system 317 is configured to include an area in front of the wheel loader 10 in its field of view. As the wheel loader 10 approaches an implement (e.g., a bucket, fork, etc.) for selective attachment to the wheel loader 10, the camera system 317 captures image data and the controller 301 processes the captured image data to identify the implement that the operator is attempting to attach to the wheel loader 10. In other implementations, the camera system 317 is configured to include all or at least part of an implement in its field of view when the implement is attached to the wheel loader 10. Accordingly, in some such implementations, the controller 301 is configured to process the captured image data to identify the implement after it has been coupled to the wheel loader 10.

In some implementations, the controller 301 is configured to use an artificial intelligence or "machine learning" mechanism (e.g., an artificial neural network) to identify the implement based on the captured image data. In some such implementations, the artificial intelligence system is configured (i.e., "trained") to detect certain physical features of different attachments that are inherent to the design of certain attachment design (e.g., coupler interface dimensions, attachment width, attachment shape, etc). In other implementations, the implement might be modified to include a design feature (e.g., a shape, color, etc.) to aid in identification.

When the implement is identified, the controller 301 accesses from the memory 305 stored machine settings corresponding to the identified implement and adjusts the machine settings of the wheel loader 10 accordingly. Therefore, this method of identifying attachments based on image data not only eliminated the requirement of a separate electronic device on the attachment (i.e., the Bluetooth Beacon 221), but it also allows the machine to identify and interchange attachments of the same type, size, model, etc. more easily. For example, the controller 301 may be configured to identify any one of a number of 3.0 yard coupler buckets on a jobsite based on captured image data. However, using the Bluetooth Beacon 221 mechanism, the controller 201 might only be able to identify a specific 3.0 yard coupler bucket that had previously been paired to the wheel loader 10.

In some implementations, the camera system 317 is configured to include the entire linkage for selectively coupling with an implement in its field of view. Accordingly, in some such implementations, the controller 301 may also be further configured to determine the position of the implement based on the captured image data. The position sensors 205 might then be omitted entirely as in the example of FIG. 3. Alternatively, in some implementations, one or more position sensors 205 may be communicatively coupled to a controller 301 in an image-based system to provide redundant or "back-up" functionality (for example, as described further below).

With the ability to identify the position of the implement and/or the implement linkage, the controller 301 can be configured to use this information in automated or semi-automated functions of the wheel-loader 10 including, for example, "return-to-dig," "return-to-carry," soft stops, and other features. In some implementations, the image-based processing for determining the position of the attached implement can be further extended to selectively attachable implements that include their own additional moveable components (e.g., grapple buckets, forks with hydraulically movable tines, excavator buckets with thumbs, etc.) to monitor not only the position of the implement relative to the wheel loader 10, but also to monitor a current state of operation of the implement.

Although the examples above specifically describe mechanisms for identifying an implement and monitoring its position for use with a wheel loader 10, in various other implementations these image-based techniques can be implement in other types of work vehicles with selectively attachable/interchangeable implements including, for example, combines and headers, tractors, motor graders, and skid steers. Furthermore, some of the mechanisms described herein can also be extended to work vehicles and machinery with permanently attached implements. For example, the system might be configured to identify a specific configuration of the work vehicle based on image data of its permanently attached implement. Alternatively, in some implementations, the image-based mechanisms for monitoring a position and/or operation of an attached implement may be integrated into a work vehicle with the functionality for identifying the implement itself based on captured image data.

Figure 4A:
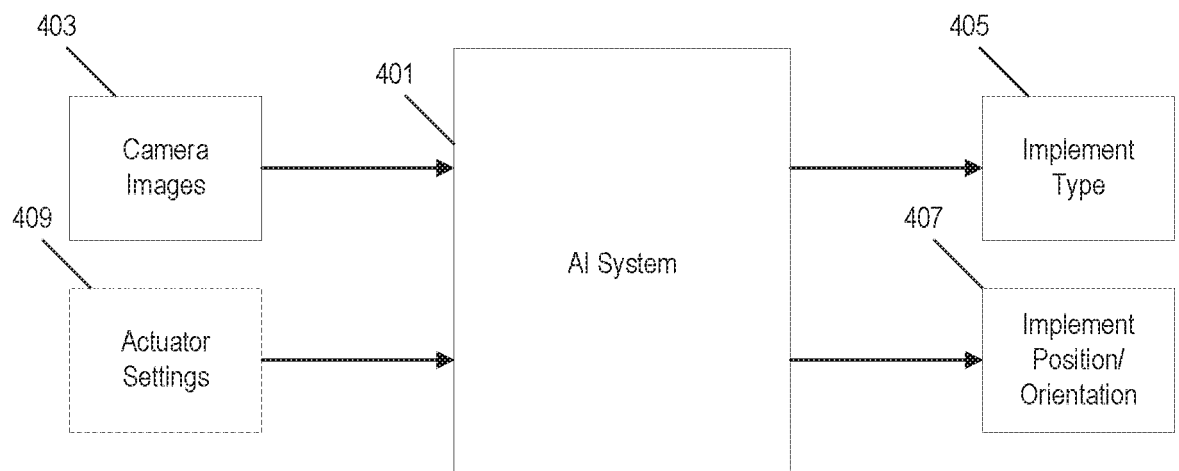
FIGS. 4A, 4B, and 4C are schematic block diagrams of an artificial intelligence-based mechanism for determining an implement type and a position of the selectively interchangeable attachment of the wheel-loader of FIGS. 1A and 1B.

As discussed above, in some implementations, the system is configured to identify an implement based on image data by using a trained "artificial intelligence" (AI) system such as, for example, an artificial neural network. FIG. 4A illustrates one example of an AI system 401 that is configured to receive camera images 403 as input and to produce as output both an indication of the implement type 405 and an indication of the position/orientation of the implement 407. In some implementations, the camera images 403 that are provided as input to the AI system include a pair of images captured by each of the two perspectives in a stereo camera. In other implementations, the camera system may be configured to simultaneously capture image data from even more than two perspectives and to provide contemporaneous image from each camera perspective as input to the AI system 401. In other implementations, the AI system 401 may be configured to receive a sequence of images from each camera showing the implement moving in space over a period of time.

In some implementations, camera images 403 are provided as the only input into the AI system 401. However, in other implementations, the AI system 401 may be configured to receive other data as input in addition to the camera images 403. For example, the controller may be configured to provide certain actuator settings 409 or sensor values (e.g., a current position of the boom cylinder 44) as further input to the AI system 401.

Figure 4B:
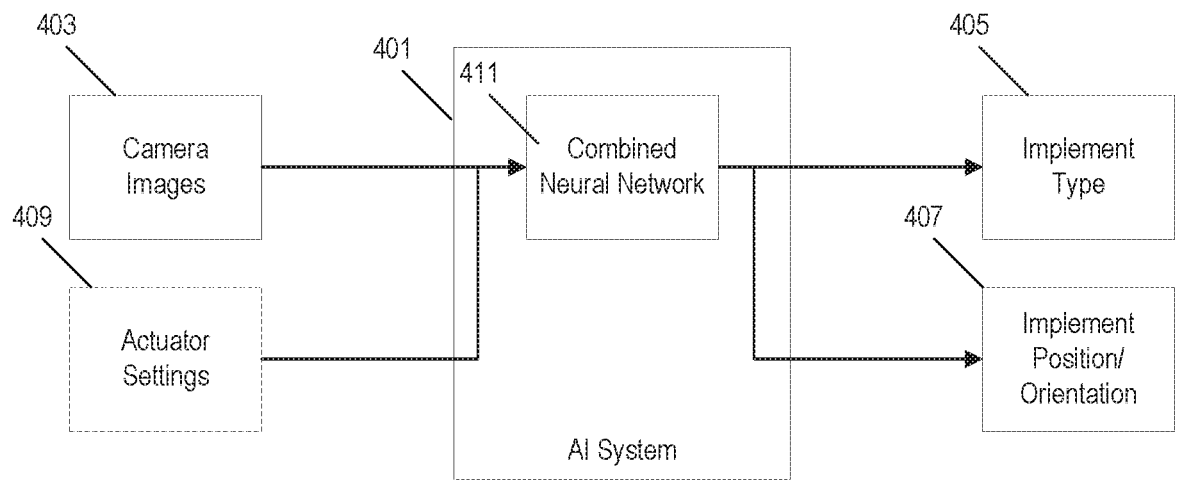
Figure 4C:
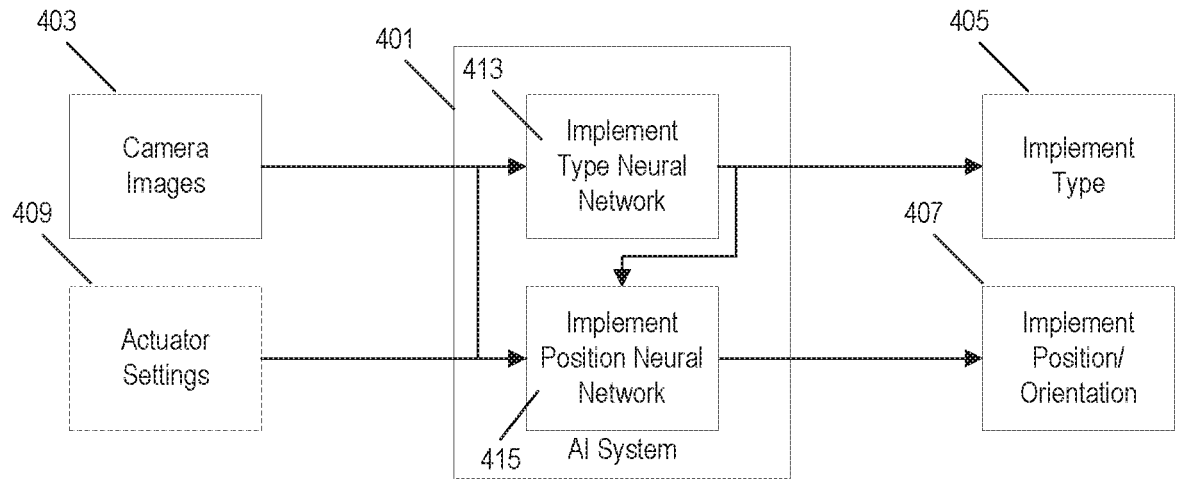

In some implementations, the AI system 401 is configured to use a single artificial neural network (i.e., combined neural network 411) that is trained to provide both an identification of the implement type 405 and the implement position/orientation 407 as outputs of the combined neural network 411 (as shown in the example of FIG. 4B). However, in other implementations, as shown in the example of FIG. 4C, the AI system 401 may be configured to implement two separate artificial neural networks including a first artificial neural network (i.e., an "implement type" neural network 413) that is trained to produce an indication of an implement type 405 as it's output based at least in part on camera images 403 as the input and a second artificial neural network (i.e., an implement position neural network 415) that is trained to produce an indication of an implement position/orientation 407 based at least in part on the camera images 403 as input. In some such implementations, the output of the first artificial neural network (i.e., the determined implement type 405) is provided as an additional input to the second artificial neural network and used, in addition to the camera images 403, to determine the implement position/orientation 407.

Figure 5:
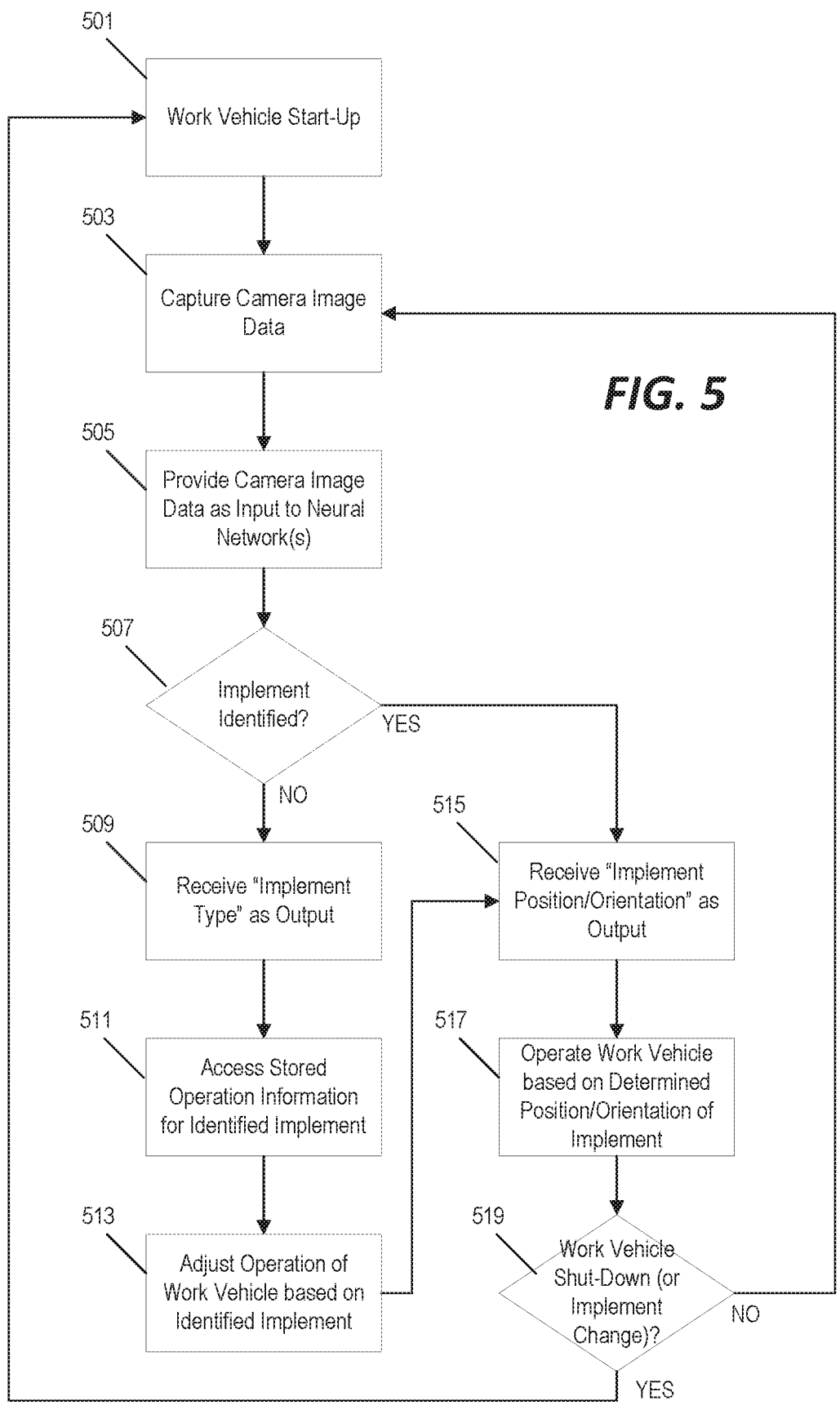
FIG. 5 is a flowchart of a method for operating the wheel-loader of FIGS. 1A and 1B based on the identified implement type and the determined position of the selectively interchangeable attachment.

FIG. 5 illustrates one example of a method for operating a work vehicle (such as, for example, a wheel loader) with a selectively interchangeable implement using an AI system such as illustrated in FIGS. 4A through 4C. When the work vehicle is started (step 501), camera image data is captured (step 503) and provided as input to the artificial neural networks (step 505). If the attached implement (or the implement to which the work vehicle is approaching for attachment) has not yet been identified (step 507), the work vehicle controller receives an indication of the implement type as an output from the artificial neural network (step 509), accesses stored operational information for the identified implement type (step 511) and adjusts the operation and/or settings of the work vehicle based on the identified implement type (step 513).

In some implementations, the camera image data is captured (step 503) and provided as input to the artificial neural network (step 505) from the time that the work vehicle is started (step 501). However, in other implementations, the process of capturing and processing camera image data using the artificial neural network may be initiated under other conditions. For example, in some implementations, the process of capturing and/or processing the camera data using the artificial neural network might instead be initiated in response to a user input (via an operator control or user interface) indicating that a coupling process has been initiated to couple the work vehicle to an implement. In other implementations, the process of capturing and/or processing the camera data might instead be initiated by an automatic mechanism including, for example, in response to a signal from a proximity sensor indicating that the work vehicle is approaching an object (e.g., which may be an implement) or another sensor configured to indicate that an implement has been newly attached to the work vehicle.

As described above, in some implementations, the controller may be configured to use the camera data only for identifying the type of implement that has been (or is in the process of being) attached to the work vehicle so that operational settings and other parameters of the work vehicle might be adjusted based on the identified implement type. However, in other implementations, the system is further configured to also continue to process the camera image data to monitor the position and/or orientation of the implement as it is operated by the work vehicle.

Returning now to the example of FIG. 5, in implementations in which the camera data and the artificial neural network are used to monitor the position and/or orientation of the implement while it is being operated by the work vehicle, the controller receives an indication of the implement position/orientation as an output from the artificial neural network (step 515) and operates the work vehicle based on the determined position/orientation (step 517). As long as the work vehicle continues to operate or, in some implementations, until a change of the selectively attached implement is made (step 519), the system continues to capture camera image data (step 503) and provide the captured camera image data as input to the artificial neural network (step 505).

In some implementations where separate artificial neural networks are used to (a) determine the implement type and (b) determine the implement position/orientation, the system may be configured to process the image data using only the second artificial neural network (i.e., the implement position/orientation neural network) on subsequent iterations after the implement type has been identified. However, in some other implementations (e.g., where a single combined neural network is configured to output both the indication of the implement type and the indication of the implement position/orientation), the system will continue to receive an indication of the implement type as the output of the artificial neural network, but does not repeat the steps of adjusting the operational settings of the work vehicle (i.e., step 513) until the implement is changed.

As discussed above in reference to FIG. 3, in some implementations, the camera system 317 replaces both the Bluetooth Beacon 221 and the sensor(s) 209 that would otherwise be used to determine a position/orientation of the implement. Accordingly, in some such implementations, the mechanical/electrical position sensors are omitted from the control system. In some implementations, the wireless antenna(s) may also be omitted entirely. However, in some implementations, the mechanical/electrical position sensors and/or the wireless antenna for wireless communications are retained as redundant/"back-up" mechanisms and/or for performing other functions. For example, instead of being configured to communicate with a Bluetooth Beacon of the implement to identify the implement, the system may be configured to include a wireless transceiver for wireless communication with other computer systems (e.g., to download server data and/or updates to the artificial neural network). Similarly, in some implementations, in order to reduce computational load on the work vehicle itself, the system may be configured to wirelessly transmit the captured camera image data to another remote computer system where it is processed using the artificial neural network and to wirelessly receive the output of the artificial neural network(s) from the remote computer system after the camera image data is processed. Also, in some implementations, where mechanical and/or electrical position sensors are included on the work vehicle to monitor the position/orientation of the implement, the system may be configured to utilize the output of the one or more position sensors for retraining the artificial neural network(s).

Figure 6:
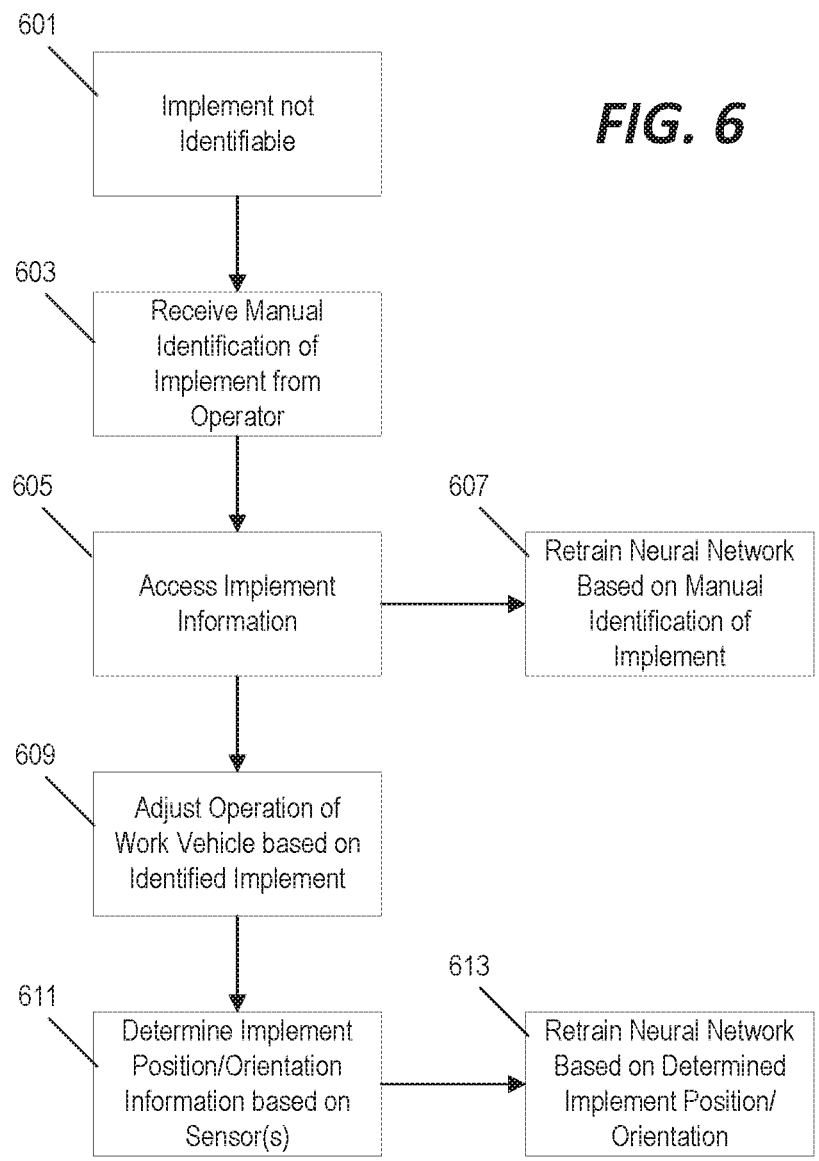
FIG. 6 is a flowchart of a method for retraining the artificial intelligence-based mechanism of FIGS. 4A, 4B, and/or 4C.

FIG. 6 illustrates one example in which the position sensors configured to monitor a position/orientation of the implement are used by the system to retrain the neural network. In this example, the method of FIG. 6 is initiated when the artificial neural network is unable to identify the implement from the captured image data (step 601). This situation could occur, for example, when a new type or new model of implement is used for the first time. In such case, the system may prompt the operator to manually identify the implement through a user interface (step 603). Additional information for the implement (including, for example, the operational settings that will be used in step 513 of FIG. 5) are accessed (step 605). In some implementations, this additional information is entered manually by the operator through the user interface of the work vehicle. However, in some other implementations, the system may be configured to request and download information through a wireless transceiver based on the identification of the implement that has been provided by the operator. In some implementations, this additional information associated with the implement is stored for future use when the same implement is subsequently coupled to the work vehicle and identified by the artificial neural network.

The artificial neural network is then retrained to associated the captured image data with the manually identified implement type (step 607) and the system is able to adjust the operational settings of the work vehicle based on the identified implement (step 609). The system is also able to retrain the artificial neural network to identify the position/orientation of the new implement based on the captured camera image data by determining the implement position/orientation information based on the output of the mechanical and/or electrical position sensors (step 611) and retraining the artificial neural network to associated the captured image data (and subsequently captured image data) with the position/orientation of the implement as indicated by the output of the position sensors (step 613).

Although the examples above focus primarily on capturing image data using a camera and processing camera images to identify the implement and/or the position of the implement, in some implementations the system is configured to use other types of optical sensors to capture the "image" data that is used as the processing input. For example, in addition to or instead of camera image data captured by a single camera, stereo camera, video cameras, etc., some implementations may be configured to operate with a LIDAR sensor or another type of visual sensor or combination of sensors capable of capturing data that can be used to construct a 2D or 3D image of the environment.

Accordingly, the invention provides, among other things, systems and methods for identifying a selectively interchangeable implement coupleable to a work vehicle and/or to monitor a position/orientation of the implement during operation based on captured image data and using one or more artificial neural networks. Further features and advantages of the invention are set forth in the following claims.

What is claimed is:

1. A method of operating a work vehicle with a selectively interchangeable implement, the method comprising:
   capturing, by an optical sensor mounted on the work vehicle, image data, wherein the captured image data includes a first implement;
   identifying an implement type of the first implement by processing, by an electronic processor, the captured image data;

accessing, from a non-transitory computer-readable memory, operation information corresponding to the identified implement type of the first implement, wherein accessing the operation information corresponding to the identified implement type of the first implement includes accessing at least one of a maximum and a minimum implement position setting for the first implement; and automatically adjusting an operation of the work vehicle based on the accessed operation information corresponding to the identified implement type of the first implement, wherein automatically adjusting the operation of the work vehicle includes controllably adjusting a position of the first implement within the maximum and the minimum implement position setting for the first implement.

2. The method of claim 1, wherein accessing the operation information corresponding to the identified implement type of the first implement includes accessing both of the maximum and the minimum implement position setting for the first implement.

3. The method of claim 1, wherein identifying the implement type of the first implement by processing the image data includes providing the image data as an input to an artificial neural network, wherein the artificial neural network is trained to receive as the input image data including at least a portion of an implement and to produce as an output an identification of the implement type of the implement in the image data; and receiving an indication of the identification of the first implement as the output of the artificial neural network.

4. The method of claim 3, wherein the optical sensor is positioned to capture image data with a field of view including the implement as the work vehicle approaches the implement for selective coupling.

5. The method of claim 1, wherein the optical sensor is positioned to capture image data with a field of view including an implement that is coupled to the work vehicle.

6. The method of claim 5, wherein the work vehicle includes a boom with a coupler at a distal end of the boom, and wherein the optical sensor is positioned to capture image data with the field of view including the implement when the implement is selectively coupled to the coupler at the distal end of the boom.

7. The method of claim 5, further comprising:

receiving, from the optical sensor mounted on the work vehicle, additional image data, wherein the additional image data includes at least a portion of the first implement while the work vehicle and the first implement are operating;

determining a current operating position of the first implement by processing the additional image data; and adjusting operation of the work vehicle based on the determined current operating position of the first implement.

8. The method of claim 7, wherein determining the current operating position of the implement includes providing the additional image data as an input to an artificial neural network, wherein the artificial neural network is trained to receive as the input image data including at least a portion of the implement that is coupled to the work vehicle and to produce as an output an indication of the current operating position of the implement; and receiving the indication of the current operating position of the first implement as the output of the artificial neural network.

9. The method of claim 8, wherein the artificial neural network includes an implement position neural network, and wherein identifying the implement type of the first implement by processing the captured image data includes providing the captured image data as an input to an implement identification neural network, wherein the implement identification neural network is trained to produce as an output an identification of the implement type of the implement captured in the image data; and receiving an indication of the identification of the first implement as the output of the implement identification neural network, wherein the implement position neural network is further configured to receive as an additional input the indication of the implement type of the first implement from the implement identification neural network.

10. The method of claim 8, wherein the artificial neural network is trained to receive image data as the input and to produce as the output both the identification of the implement type of the first implement and the indication of the current operating position of the first implement.

11. The method of claim 8, wherein providing the additional image data as the input to the artificial neural network includes providing a sequence of images captured by the optical sensor over a period of time as the input to the artificial neural network.

12. The method of claim 7, wherein adjusting the operation of the work vehicle based on the determined current operating position of the first implement includes performing an automated or semi-automated process by controllably adjusting the position of the first implement relative to the work vehicle.

13. The method of claim 12, wherein the automated or semi-automated process includes at least one selected from a group consisting of a return-to-dig operation, a return-to-carry operation, and a soft-stop operation.

14. A control system for a work vehicle, the work vehicle being operatively coupleable to a selectively interchangeable implement, the control system comprising:

an optical sensor system mounted on the work vehicle and positioned with a field of view including at least a portion of an implement coupled to the work vehicle;

a non-transitory computer-readable memory storing operation information corresponding to each of a plurality of implements; and an electronic processor configured to perform an operation by controllably adjusting a position of the implement relative to the work vehicle, receive image data captured by the optical sensor system, apply an artificial neural network to identify an implement type of the implement that is currently coupled to the work vehicle based on the image data from the optical sensor system, wherein the artificial neural network is trained to receive the image data as input and to produce as an output an indication of the implement type, access, from the non-transitory computer-readable memory, the operation information corresponding to the identified implement type, wherein accessing the operation information corresponding to the identified implement type includes accessing at least one of a maximum implement position setting and a minimum implement position setting for the implement, and automatically adjusting the operation of the work vehicle based on the accessed operation information corresponding to the identified implement type, wherein automatically adjusting the operation of the work vehicle includes controllably adjusting a position of the implement within at least one of the maximum implement position setting and the minimum implement position setting for the implement.

15. The control system of claim 14, wherein the artificial neural network is further trained to produce as the output an indicative of a current operating position of the implement that is currently coupled to the work vehicle, and wherein the electronic processor is further configured to generate control signals to one or more actuators to perform an automatic or semi-automatic operation based on the current operating position of the implement.

\* \* \* \* \*